UNITED STATES PATENT OFFICE.

GUIDO BLENIO, OF NEW YORK, N. Y.

FIREPROOF COMPOSITION FOR USE ON WOOD.

SPECIFICATION forming part of Letters Patent No. 716,660, dated December 23, 1902.

Application filed July 8, 1902. Serial No. 114,826. (No specimens.)

*To all whom it may concern:*

Be it known that I, GUIDO BLENIO, a citizen of Austria-Hungary, residing at New York, in the county of New York and State of New York, have invented certain new and useful Improvements in Fireproof Composition for Use on Wood, of which the following is a full and complete specification, such as will enable those skilled in the art to which it appertains to make and use the same.

My composition consists of the following ingredients combined in the proportion specified, viz: alum, one-half pound; potash, one-half pound; liquid glass, one-half pint; whiting, two pounds; water, one gallon.

In practice I first mingle or mix together the alum and potash and then dissolve the product thus formed in the water, after which the whiting is stirred in, and the product thus formed is stirred or agitated until all the parts are thoroughly mingled, after which the liquid glass is added, and the combined product is again thoroughly mingled, so as to form a homogeneous solution. The solution thus formed is applied to the wood in the manner of a paint by means of an ordinary brush or brushes, and the entire surface of the wood is thoroughly covered at all points, and when thus treated and allowed to dry the wood will be fireproof under all conditions and will not ignite under any circumstances and will only char when subjected to a very high degree of heat.

My improved composition or solution is particularly adapted for use on wood used in dwellings and other houses for any purpose whatever, but may be used on wood employed in structural work of any kind or wherever it is necessary to prevent the burning of the wood.

Having fully described my invention, what I claim as new, and desire to secure by Letters Patent, is—

1. The herein-described composition of matter consisting of alum, potash, liquid glass, whiting, and water, substantially as described, and for the purpose set forth.

2. The herein-described composition of matter consisting of alum one-half pound, potash one-half pound, liquid glass one pint, whiting two pounds, water one gallon, substantially as described and for the purpose set forth.

In testimony that I claim the foregoing as my invention I have signed my name, in presence of the subscribing witnesses, this 28th day of June, 1902.

GUIDO BLENIO.

Witnesses:
F. A. STEWART,
C. E. MULREANY.